US006983318B2

(12) United States Patent
Doyle

(10) Patent No.: US 6,983,318 B2
(45) Date of Patent: *Jan. 3, 2006

(54) CACHE MANAGEMENT METHOD AND SYSTEM FOR STORING DYNAMIC CONTENTS

(75) Inventor: Ronald P. Doyle, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 800 days.

This patent is subject to a terminal disclaimer.

(21) Appl. No.: 09/767,237

(22) Filed: Jan. 22, 2001

(65) Prior Publication Data
US 2002/0099807 A1 Jul. 25, 2002

(51) Int. Cl.
G06F 15/273 (2006.01)
(52) U.S. Cl. ................. 709/223; 709/245
(58) Field of Classification Search ........... 709/203, 709/213, 216, 219, 217, 223, 226, 232, 246, 709/220, 245, 224, 225, 229, 201; 707/200, 707/102, 10, 103; 711/122, 3, 119, 133, 711/113, 118; 715/500; 705/26, 51; 370/486, 370/254; 700/9; 713/201
See application file for complete search history.

(56) References Cited

U.S. PATENT DOCUMENTS

| 4,399,503 | A | * | 8/1983 | Hawley ................. 711/113 |
| 4,785,398 | A | * | 11/1988 | Joyce et al. ............. 711/3 |
| 5,740,430 | A | * | 4/1998 | Rosenberg et al. ......... 707/200 |
| 5,961,602 | A | * | 10/1999 | Thompson et al. ......... 709/229 |
| 5,988,847 | A | * | 11/1999 | McLaughlin et al. ......... 700/9 |
| 6,038,668 | A | * | 3/2000 | Chipman et al. ........... 713/201 |
| 6,055,569 | A | * | 4/2000 | O'Brien et al. ............ 709/223 |
| 6,098,096 | A |  | 8/2000 | Tsirigotis et al. .......... 709/213 |
| 6,173,310 | B1 | * | 1/2001 | Yost et al. ............... 709/201 |
| 6,185,608 | B1 | * | 2/2001 | Hon et al. ............... 709/216 |
| 6,199,107 | B1 | * | 3/2001 | Dujari ................... 709/219 |
| 6,205,481 | B1 | * | 3/2001 | Heddaya et al. ........... 709/226 |
| 6,249,804 | B1 | * | 6/2001 | Lam .................... 709/203 |
| 6,272,598 | B1 | * | 8/2001 | Arlitt et al. .............. 711/133 |
| 6,330,595 | B1 | * | 12/2001 | Ullman et al. ............ 709/219 |
| 6,330,606 | B1 | * | 12/2001 | Logue et al. ............. 709/226 |
| 6,351,767 | B1 | * | 2/2002 | Batchelder et al. ........ 709/219 |
| 6,385,596 | B1 | * | 5/2002 | Wiser et al. ............. 705/51 |
| 6,449,657 | B2 | * | 9/2002 | Stanbach et al. .......... 709/245 |
| 6,480,887 | B1 | * | 11/2002 | Hayama ................. 709/217 |
| 6,542,964 | B1 | * | 4/2003 | Scharber ................ 711/122 |

(Continued)

OTHER PUBLICATIONS

Web Server QoS Management by Adaptive Content Delivery—Abdelzaher, Bhatti (1999); www.eecs.umich.edu/~zaher/iwqos99.ps.*

(Continued)

Primary Examiner—Thong Vu
(74) Attorney, Agent, or Firm—Synnestvedt & Lechner LLP; Jerry W. Herndon

(57) ABSTRACT

A cache management method and system for storing dynamic contents such as web pages. In a computing environment, a server maintains a cache for temporarily storing dynamic pages. Each of the cached pages is associated with resource information indicating a level of resources used to create the cached page. A newly created page replaces one of the cached pages in the cache if it is less expensive to recreate that cached page than to recreate the newly created page based on the resource information.

37 Claims, 6 Drawing Sheets

U.S. PATENT DOCUMENTS

| | | | | |
|---|---|---|---|---|
| 6,591,266 B1 * | 7/2003 | Li et al. | ................ | 707/10 |
| 6,622,168 B1 * | 9/2003 | Datta | ................ | 709/219 |
| 6,647,411 B2 * | 11/2003 | Towell et al. | ................ | 709/213 |
| 6,678,793 B1 * | 1/2004 | Doyle | ................ | 711/133 |
| 6,697,824 B1 * | 2/2004 | Bowman-Amuah | ................ | 709/229 |
| 6,725,421 B1 * | 4/2004 | Boucher et al. | ................ | 715/500.1 |
| 6,732,237 B1 * | 5/2004 | Jacobs et al. | ................ | 711/119 |
| 6,742,043 B1 * | 5/2004 | Moussa et al. | ................ | 709/232 |
| 6,745,368 B1 * | 6/2004 | Boucher et al. | ................ | 715/500.1 |
| 6,757,708 B1 * | 6/2004 | Craig et al. | ................ | 709/203 |
| 6,763,376 B1 * | 7/2004 | Devine et al. | ................ | 709/223 |
| 6,772,200 B1 * | 8/2004 | Bakshi et al. | ................ | 709/217 |
| 6,772,209 B1 * | 8/2004 | Chernock et al. | ................ | 709/225 |
| 6,788,709 B1 * | 9/2004 | Hyakutake | ................ | 370/486 |
| 6,799,248 B2 * | 9/2004 | Scherr | ................ | 711/118 |
| 6,810,417 B2 * | 10/2004 | Lee | ................ | 709/220 |
| 6,904,449 B1 * | 6/2005 | Quinones | ................ | 709/203 |
| 2002/0038360 A1 * | 3/2002 | Andrews et al. | ................ | 709/223 |

OTHER PUBLICATIONS

Efficient Support for P-HTTP in Cluster-Based Web Servers—Aron, Druschel, Zwaenepoel (1999) ; www.cs.rice.edu/~aron/papers/phttp-lard.ps.*

A Media-Independent Content Language for Integrated Text and..—Nancy Green (1998); www.cs.cmu.edu/afs/cs.cmu.edu/user/ngreen/public-web-pages/cvir98.ps.*

Logical Information Modeling of Web-accessible Heterogeneous..—Kshitij Shah (1998); ra.cs.uga.edu/publications/adl/adl.ps.*

Alchemica WebSite: Project-based web site development and publishing software http://www.alchemica.com/.*

CyberLink—Web Site Hosting Services; cyberlinkcom.com/webservices/webhost.htm.*

Graphic Visions Web Design Introduction; www.graphic-visions.com/websites/web-intro.htm.*

On the Placement of Web Server Replicas—Qiu, Padmanabhan, Voelker (2001) □□www.research.microsoft.com/~padmanab/papers/infocom2001.ps.*

IP Multicast Channels: EXPRESS Support for Large-scale..-Holbrook, Cheriton (1999) □□cosmos.kaist.ac.kr/~krkang/mcast/papers/express.ps.gz.*

MEMS-Based Integrated-Circuit Mass-Storage Systems—Carley, al. (2000) □□www.pdl.cs.cmu.edu/PDL-FTP/Storage/CARLEY_CACM.pdf.*

* cited by examiner

FIG. 5

| Cache Entry No. (230) | Page Identifier (220) | Generation Cost Tag (225) |
|---|---|---|
| 1 | URL10 | 5 |
| 2 | URL1 | 20 |
| 3 | URL3 | 15 |
| ... | ... | ... |
| n | URLx | 17 |

CACHE MANAGEMENT METHOD AND SYSTEM FOR STORING DYNAMIC CONTENTS

BACKGROUND OF THE INVENTION

1. Field of the Invention

The present invention relates to cache management and, more particularly, to a method and system for managing a cache of a server based on the levels of resources used to create dynamic content stored in the cache.

2. Description of the Related Art

Web pages or other computer pages that are created using variable data are known as "dynamic" pages. Generally, an application server on a network creates these dynamic pages by running programs such as Servlets. Each time a dynamic page is created, however, a significant amount of resources are used. Among the resources used, most page providers (e.g., website providers) are concerned with the monetary cost involved with generating a dynamic page. The generation cost of a dynamic page typically includes, but is not limited to, the cost of running the CPU (Central Processing Unit) on the application server, the cost of invoking EJB (Enterprise Java Bean) and JSP (Java Servlet Page) modules typically used to generate HTML file(s) corresponding to the page, and the network cost of invoking the application server and other processing devices. In most systems, the generation cost for a dynamic page can be rather high, which cost the page provider bears each time a dynamic page is created.

To reduce the costs associated with providing dynamic pages to users, it is common practice to store in a cache located on the application server some of the previously created dynamic pages that are frequently requested by the users. A cache is a temporary storage unit or location for temporarily storing previously created dynamic content such as dynamic pages, so that the application server need not recreate the same page each time a user requests it. However, not all previously created pages can be stored in the cache of the application server because the cache has limited memory space. To address this problem, certain criteria or page replacement methods may be used to determine which of the dynamically created pages should be "saved" in the cache for a subsequent use.

Several page replacement methods are known for managing the cache of an application server in a network environment. Among these methods, most frequently used are the Least Recently Used (LRU) method and the Hit Count method. In the LRU method, the system is configured to replace the least recently used pages stored in the cache with newly created pages. That is, the criteria used for replacing the cached pages is the time and date of the most recent access of the pages currently stored in the cache. In the Hit Count method, the system is configured to replace pages that are accessed less frequently. In other words, the cached pages are replaced based on how frequently the cached pages are accessed. These replacement methods, however, fail to consider the amount of resources used in, or page generation costs associated with, creating the cached pages. As a result, the prior art systems may replace a cached page with a new page even though it may be more expensive to recreate the cached page than to recreate the new page. Thus, the conventional cache management methods do not serve effectively the needs of page providers.

With the advent of personalized web pages and the growing number of business websites found on the web, the number of dynamic pages that are temporally stored or "cached" is growing at a fast rate. As the number of dynamic pages requiring complex back-end processing grows, the cache management methods for dynamic content become much more important because they can have a significant impact on the overall operation of the system. It is thus important to have a cache management system and method which can overcome the problems of conventional cache management methods and which can reduce the page provider's costs of providing dynamic pages to end-users.

SUMMARY OF THE INVENTION

The present invention provides an improved cache management method and system for storing dynamic contents in a computing environment. The cache management method considers predetermined parameters associated with the dynamic content, such as the costs associated with generating web pages, and selectively replaces the dynamic contents that are stored in the cache with new dynamic content based on the predetermined parameters, e.g., the generation costs. In this manner, storage of dynamic content in the cache is prioritized based on the predetermined parameters. In the previously described web page example, pages stored in the cache that are expensive to recreate are not replaced with the new pages and the costs of providing dynamic pages to the users can be reduced significantly.

In a preferred embodiment, each time a dynamic page is created, the generation cost information identifying the cost of generating that page is associated with that page, e.g., using tags. A newly generated page can be stored in the cache of a server if there is an empty slot in the cache, so that the new page can be retrieved from the cache for a subsequent use. If the cache is full, however, the server uses the generation cost information to determine if any of the cached pages can be replaced with the new page. The server compares the generation cost of the new page with the generation costs of the cached pages and selects a cached page that is less expensive to recreate compared to the new page. The selected cached page is replaced with the new page in the cache.

Thus, the present invention provides a cache management system and method which implements a page replacement technique having a more global view, in that it considers the entire cost of generating a dynamic page from all involved machines and networks before the page can be replaced in the cache. As a result, the cost of providing dynamic pages to end-users can be reduced significantly and the efficient allocation of resources can be achieved in connection with the generation of dynamic pages.

BRIEF DESCRIPTION OF THE DRAWINGS

FIG. 5 is an example of a table which may be used in the present invention.

DETAILED DESCRIPTION OF THE PREFERRED EMBODIMENTS

Figure 1:
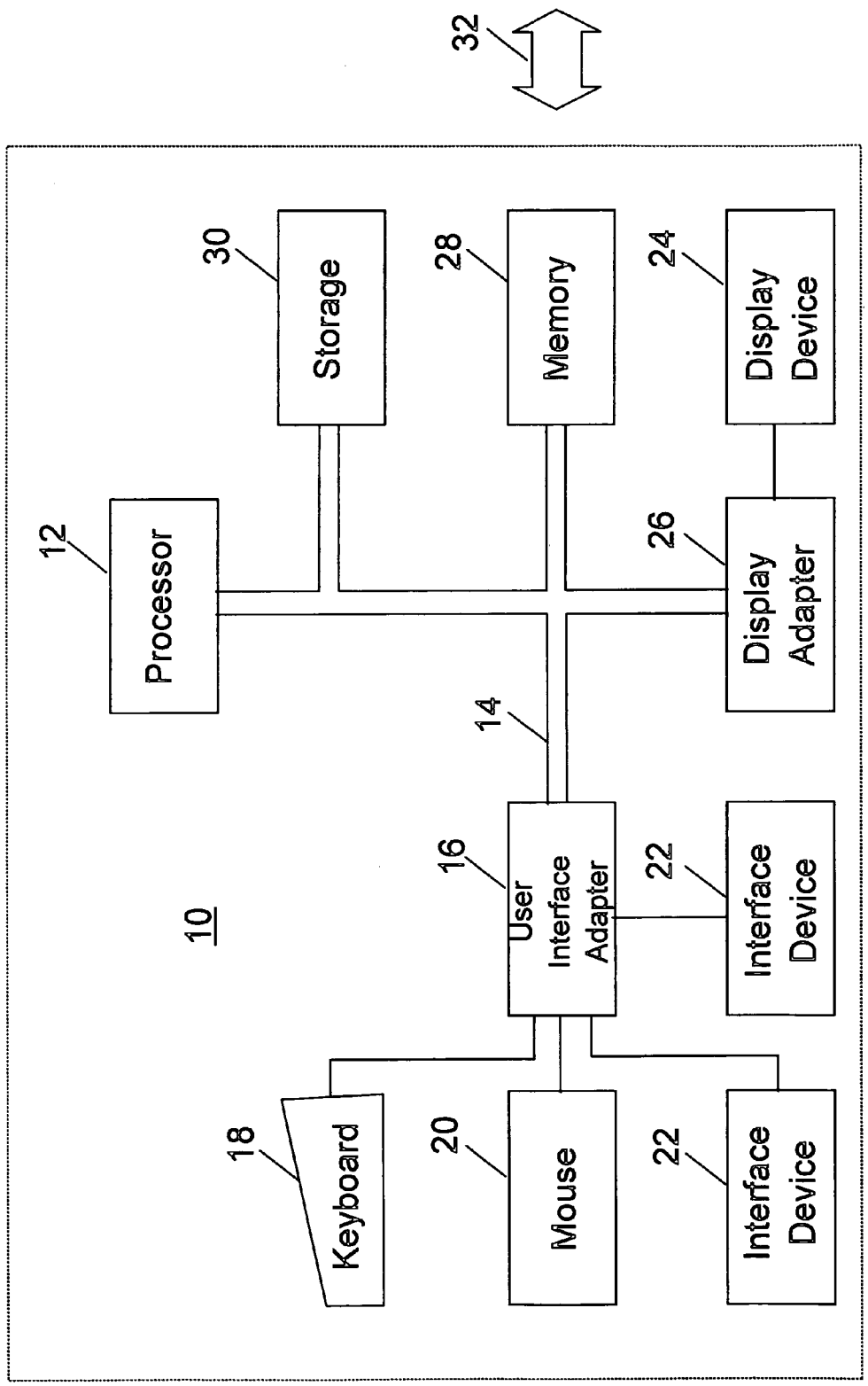
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, a mouse 20, and/or other interface devices 22, which can be any user interface device, such as a touch sensitive screen, a digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (Cellular Digital Packet Data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
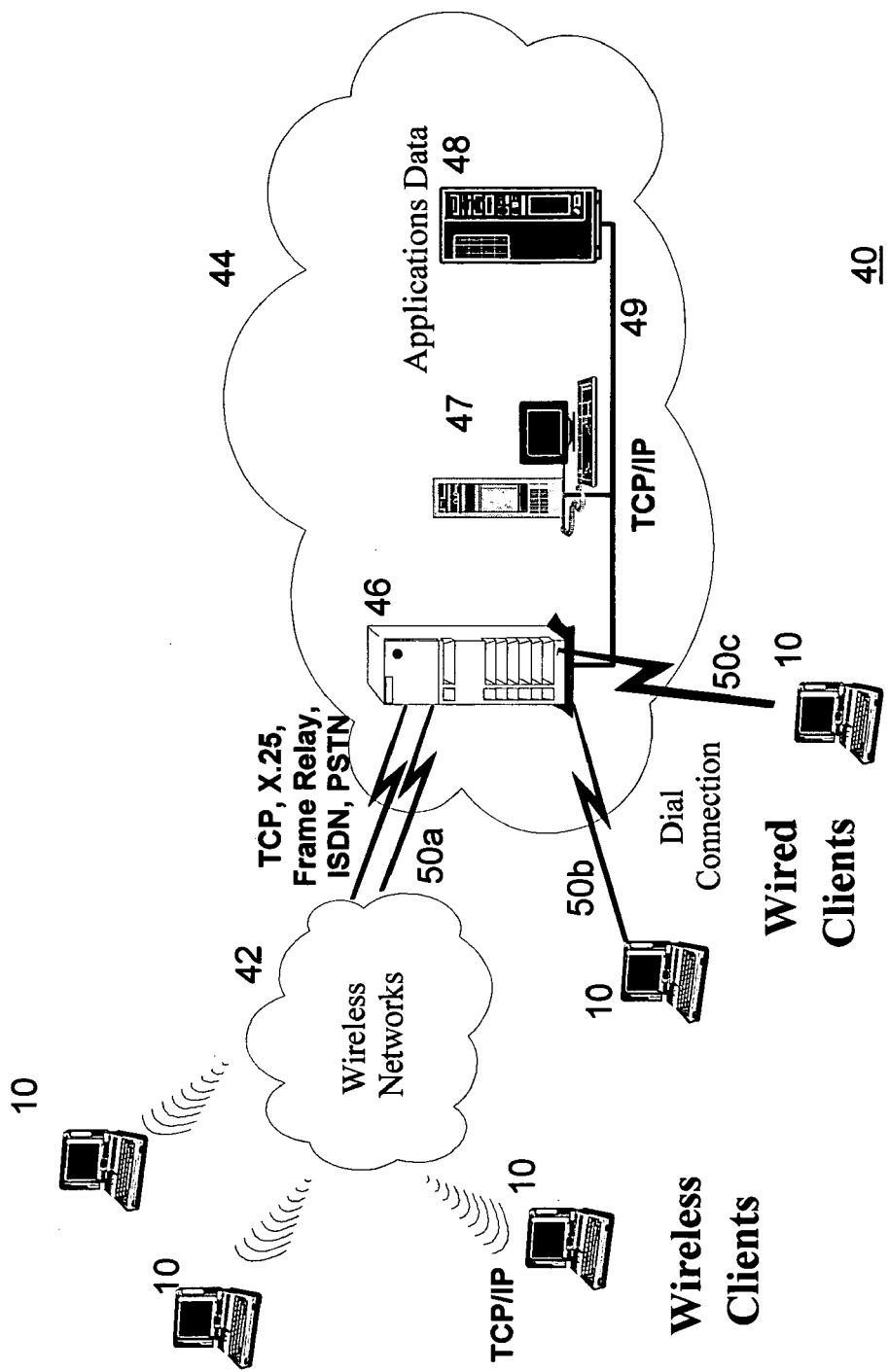
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a proxy server 46 and/or application server 47 (which may access a data repository 48). The proxy server 46 serves as a point of entry into each network 42, 44 and may also be known as an "edge server" or "gateway computer." The proxy server 46 is an intermediary server which interfaces between the application server 47 and the workstations 10, and may maintain its own cache for temporarily storing or "caching" dynamic contents, e.g., dynamic pages. The proxy server 46 may be coupled to another network 42 or 44 by means of a communications link 50a and communicate with an application server in that network. The proxy server 46 may also be directly coupled to one or more workstations 10 using a communications link 50b, 50c. The proxy server 46 may also be coupled 49 to a storage device (such as data repository 48 or other data repositories). Further, the proxy server 46 may be indirectly coupled to one or more workstations 10. The proxy server 46 relays requests and information between the application server 47 and the workstations 10. If the proxy server 46 is unable to process a request (e.g., a page request) transmitted from the workstations 10, it relays the request to an appropriate application server 47 which then responds to the request. Here, the application server 47 may be located in the same network or in another network remotely located from the proxy server 46.

The application server 47 maintains its own cache for temporarily storing the dynamic pages. In response to a page request from the proxy server 46, the application server 47 invokes programs (e.g., Servlets) to create the requested page if the requested page is not available from the cache of the application server 47 and transmits the created page to the proxy server 46. However, if the requested page is stored in the cache of the application server 47, the application server 47 merely retrieves it from the cache and transmits the retrieved page to the proxy server 46. The proxy server 46 then redirects the page back to the requester's workstation 10. A main difference between the application server 47 and the proxy server 46 is that the application server 47 can create dynamic pages if needed, whereas the proxy server 46 cannot.

The workstations 10 may be connected to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the proxy server 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the proxy server 46 using dial connections 50b or 50c. Further, the wireless network 42 and network 44 may connect to one or more other networks (not shown), in an analogous manner to that depicted in FIG. 2. Moreover, the application server 47 may be located a great distance from the proxy server 46 and may communicate with the proxy server 46 via a network.

For the purposes of illustration only and not of limitation, a preferred embodiment of the present invention is now described herein in terms of servicing a request for a dynamic page to be delivered to a requesting client. However, the principles of the present invention are equally applicable to servicing requests for any dynamic contents or data. The requester of page content may, in some cases, be application software. Thus the references herein to a client are intended to include such scenarios, in addition to those in which the requester is an end-user. Furthermore, the term "computer page" or "page" is used herein for ease of reference only and is intended to cover any form of a dynamic web page.

Figure 3:
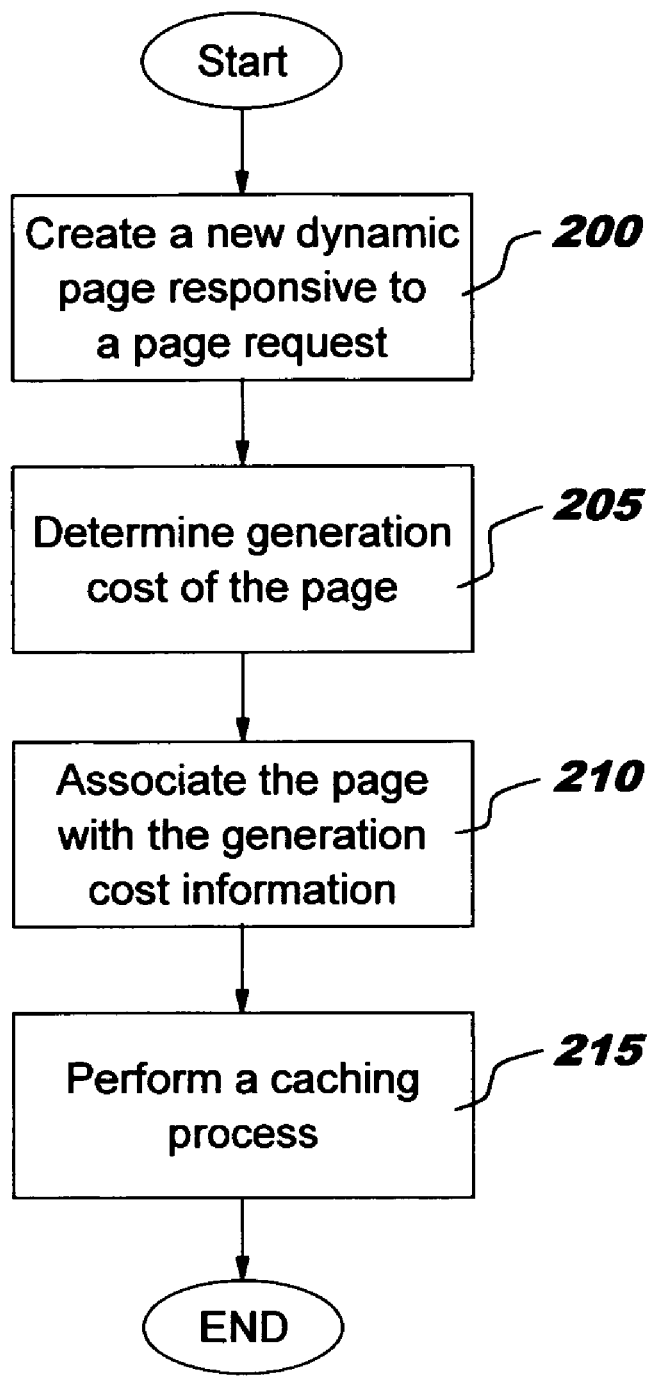
FIG. 3 illustrates a flowchart showing the processing steps involved in a cache management method according to a simple embodiment of the present invention.

FIG. 3 is a flowchart of the processing steps involved in a cache management method according to a simple embodiment of the present invention. These steps may be implemented by the application server 46 discussed in connection with FIG. 2. As shown in FIG. 3, a dynamic page is generated in Step 200 responsive to a page request from a user or from another server such as a proxy server. The page can be generated using known page generation techniques, e.g., by running page generation programs such as Servlets. At this or later time, the generated page is delivered to the page requester.

In Step 205, the cost of generating the created page is determined. Various of methods of determining the generation cost for a dynamic page are known and can be use herein. For example, the cost of generating a dynamic page can be calculated manually, or the system may be configured to calculate the cost using certain computer programs or algorithms. Once the generation cost information is obtained, this information is associated with the created page in Step 210. In accordance with an exemplary embodiment, one or more "tags" are used to associate the generation cost information with the page. The use of tags to associate data is well known in the art. In the present invention, the tags themselves may carry the generation cost information or may function merely as a pointer indicating where the generation cost information can be found. The tag(s) may be coupled to the page file directly or to the identifier of the page, e.g., the URL (Uniform Resource Locator) corresponding to the page. Once the generation cost information is associated with the page, a caching process for selectively storing the page in the cache of a server according to the present invention is performed in Step 215.

Figure 4:
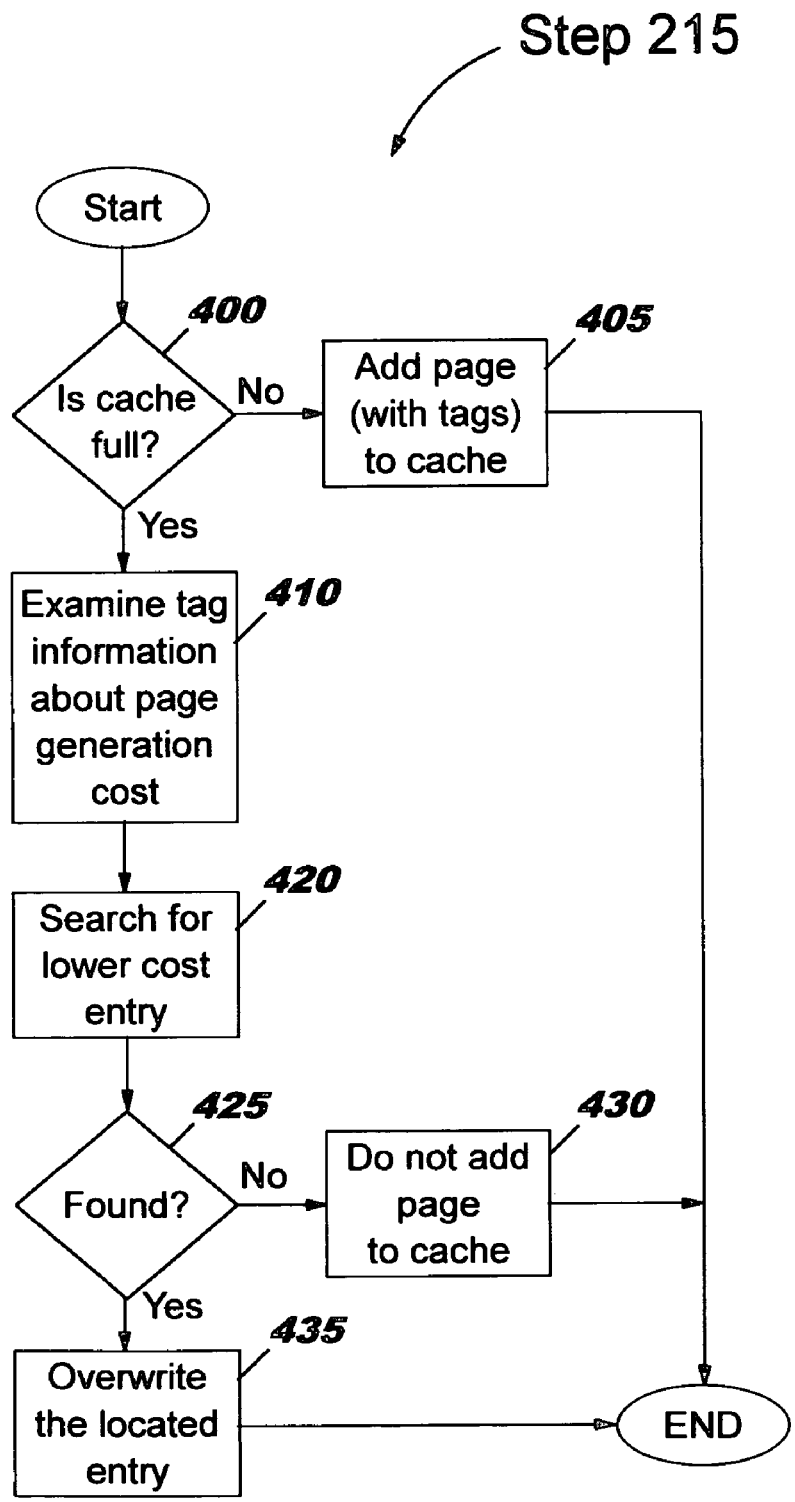
FIG. 4 illustrates a flowchart showing the processing steps involved in Step 215 of FIG. 3 according to the present invention.

FIG. 4 is a flowchart illustrating the processing steps involved in Step 215 of FIG. 3. As shown in FIG. 4, in Step 400, a determination is made whether the cache of the server is full. If the cache is not full, then in Step 405, the page is stored in the cache of the server along with the tag(s) identifying the generation cost information. In this manner, each of the pages stored in the cache is associated with the generation cost information identifying the generation cost of that page. If in Step 400 the determination indicates that the cache is full, the generation cost tag(s) associated with the current page are examined in Step 410. Then in Step 420, the generation cost information associated with each of the pages stored in the cache is examined to search for a cached entry having the page generation cost that is lower than the generation cost of the current page. If the search indicates in Step 425 that a cached entry with a lower generation cost is not found, then in Step 430 it is determined that the current page cannot be added to the cache and the caching process ends. The pages that are not cached may be discarded after the pages are returned to the page requester. If, in Step 425, the search indicates that a cached entry with a lower generation cost is found, the lower-cost cached entry is replaced with the current page and the associated cost tag(s) are stored in Step 435. If the search locates multiple cached entries with lower generation costs, the cached entry with the lowest generation cost among the located cached entries may be replaced, or other schemes may be utilized to narrow the entries to one. For instance, applying the conventional Least Recently Used (LRU) method or Hit Count method herein, from the multiple cached entries that are found, the entry that was least recently or least frequently accessed by the user may be replaced with the current page and its tags. After Step 435, the caching processing of FIG. 4 is completed.

FIG. 5 shows one example of a table which may be used in the search process of Step 420 in FIG. 4 according to the present invention. As shown in FIG. 5, the table identifies (1) a series of cache entry numbers 230 (or addresses) each identifying a particular location in the cache where a page is stored, (2) a series of page identifiers (e.g., URLs) 220 each identifying the page stored in the associated cache entry location, and (3) a list of the generation cost tags 225 each associated with a particular page identifier. In utilizing the table in the search process of Step 420, for example, if the generation cost of the currently generated page is 6 and the system is configured to recognize that lower tag values indicate lower generation costs, then a hashing technique or other search method may be used to search the table and determine whether any of the generation cost tags has a value less than 6. In this example, the cache entry number 1 has the generation cost tag value of 5 and is thus selected as having the generation cost lower than the generation cost of the current page. Accordingly, the page stored at the cache entry number 1 location of the cache and identified by URL10 is replaced with the current page. Thereafter, the table is updated to reflect this replacement.

Figure 6:
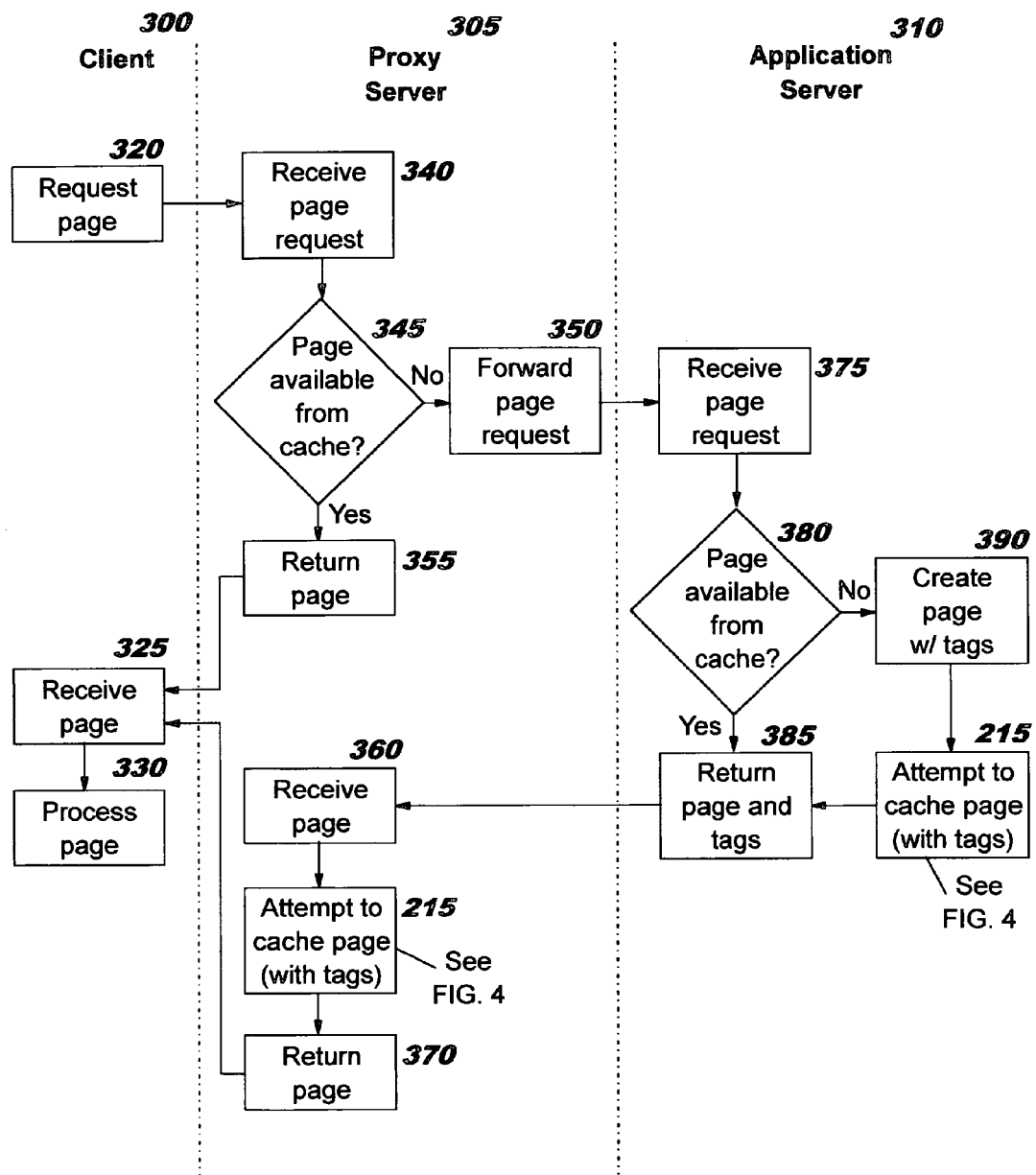
FIG. 6 illustrates a flowchart showing the processing steps involved in a cache management method which may be implemented in a network environment according to another embodiment of the present invention.

FIG. 6 depicts the processing steps involved in a cache management method according to another embodiment of the present invention. These steps may be implemented in the computer network environment illustrated in FIG. 2 such that, in one embodiment, a client 300, a proxy server 305, and an application server 310 in FIG. 6, all operatively coupled, may represent respectively the workstation 10, the proxy server 46, and the application server 46 in FIG. 2. In the alternative, these processing steps may be practiced in other computing environments or in other components. In the embodiment shown in FIG. 6, any page stored in the cache of a server is associated with the generation cost information identifying the cost of generating that page, e.g., using tags, as discussed hereinabove.

Referring now to FIG. 6, in Step 320, a page or content request is generated by the client 300, e.g., by a user entering a URL of the desired page/website in his computer or workstation 10. The page request is sent to the network (e.g., under control of the user's web browser) and received by the proxy server 305 in Step 340. In some applications, the proxy server 305 may be located at the client's Internet Service Provider (ISP) site. If the proxy server 305 is configured to maintain its own cache, then the proxy server 305 determines in Step 345 whether the requested page is available from its cache. Those skilled in the art would appreciate that the proxy server 305 is not required to have its own cache. Instead, it may receive caching services through some other means such as a stand alone cache or an external cache and Step 345 is equally applicable in such situations.

If the requested page is available from the cache (or caching services) of the proxy server 305 (i.e., Step 345 has a positive result), the proxy server 305 retrieves that page from the cache and returns it to the client 300 in Step 355, and the page replacement process of the present invention is not invoked to provide the requested page. Upon receipt of the returned page in Step 325, the client 300 (i.e., the computer) either displays the page or further processes it in Step 330 using techniques that are well known in the art. The processing of the page request from the client 300 is then completed.

If the requested page is not available from the cache of the proxy server 305 (i.e. Step 345 has a negative result), then the proxy server 305 forwards the page request to an appropriate application server 310 in Step 350. In some cases, the application server 310 may be a server located at the main terminal servicing the requested page or related website. For instance, a user's request for an IBM web page having the URL "www.ibm.com" may be processed by an application server such as the IBM main frame server servicing IBM websites.

Upon receipt of the forwarded page request at Step 375, the application server 310 searches its own cache for the requested page at Step 380. If the requested page is found in the cache of the application server 310, the application server 310 retrieves the requested page from its cache and returns it to the proxy server 305 in Step 385.

When the determination in Step 380 indicates that the requested page is not available from the cache of the application server 310, the process proceeds to Step 390 where the application server 310 creates the requested page and the cost of generating the requested page is determined and associated with the page, e.g., using tags. In other words, Step 390 is identical to the combination of Steps 200, 205 and 210 in FIG. 3. Then Step 215, previously described in connection with FIG. 4 above, is performed wherein the created page is evaluated for storage in the cache of the application server 310 using the generation cost tags associated with the pages stored in the cache of the application server 310. After the page has been cached (or, alternatively, prior to or contemporaneously with caching the page), the application server 310 returns the created page and its generation cost tags to the proxy server 305 in Step 385.

The proxy server 305 receives in Step 360 the requested page and its tags from the application server 310. Then Step 215 (see FIG. 4) is performed wherein the proxy server 305 evaluates whether the received page should be stored in the cache of the proxy server 305 for a subsequent use. After Step 215, the received page is returned to the requesting client 300 in Step 370. From Step 370, the process proceeds to Steps 325 and 330 where the page is processed as previously described hereinabove. The processing of the page request from the client 300 is then completed according to this embodiment.

Those skilled in the art would readily understand that the order of certain steps shown in FIG. 6 may be changed without affecting the outcome according to the present invention. For example, the order of Steps 215 and 385 (performed by the application server) may be reversed, or these steps may occur simultaneously. Similarly, the order of Steps 215 and 370 (performed by the proxy server) may be reversed, or these steps may occur simultaneously. Furthermore, in Steps 345 and 380, the requested page may not become available from the cache for accessing by the server even when the page is stored in the cache, if the cached page has become stale or invalid according to prior art invalidation criteria. In these cases, the determination made in Step 345 or 375 would yield a negative result.

In some applications, the proxy server 305 does not maintain its own cache. If so, Steps 345, 355, and 365 are omitted (e.g., proceed from Step 340 directly to Step 350; from Step 360 directly to 370). In addition, it may happen that more than one intermediate device which provides caching, such as the proxy server 305, is encountered in the network path. In this case, each such intermediate device may perform the logic depicted in Steps 340 through 370 including Step 215.

In accordance with the present invention, the tags associated with each content may identify content generation costs, so that those cached contents that are more expensive to recreate than to recreate the newly created content, are not replaced and can be maintained in the cache of a server. The generation costs for each page may include, but are not limited to, the cost of running the CPU on the application server, the cost of invoking EJB (Enterprise Java Bean) and JSP (Java Servlet Page) modules typically used to generate HTML or other files corresponding to the page, and the network cost of invoking the application server and other processing devices. It should be clearly understood that, although the tags are herein described in association with the generation costs, the tags in accordance with the present invention may identify any other parameters or additional resource information associated with the generation of a page, e.g., a duration of time involved in generating a page. The tags identifying other resource information can be used as an alternative or in conjunction with the tags identifying the generation costs. In some embodiments, default tags may be used when pages with faulty tags are found or the tags themselves cannot be located. A default tag may represent the page as the "lowest priority" item or as highly replaceable in order to provide compatibility with caching systems and service providers that do not support the generation cost levels of the present invention.

In still other embodiments, the conventional replacement policies such as the LRU or Hit Count algorithms can be further combined with the resource-based replacement policy of the present invention. For instance, when a time arises to determine if the newly created content should replace any entry stored in the cache of a server, the cache may be searched for an entry that is least recently or least frequently accessed by the user as in the LRU or Hit Count method. If the search locates such an entry, the tag(s) associated with that entry identifying the resource information can be examined. If the resource tag(s) associated with the located entry indicate that the regeneration of the located entry requires more resources or higher generation costs than the newly created content, then the located entry may not replaced by the new content. This results in a page replacement policy for a cache management system which maximizes an efficient allocation of resources for the system.

The present invention may be implemented in a number of distributed computing environments. For example, the implementation of the present invention may occur in a web environment, where an application/web server provides services in response to requests transmitted using the HyperText Transfer Protocol (HTTP) from a client connected through the Internet. Alternatively, the implementation of the present invention may be realized in a non-web environment (e.g., using the Internet, a corporate intranet or extranet, or any other network) where cached information is accessed by distributed applications (e.g., using techniques such as: Remote Method Invocation or RMI; IIOP which is the Internet Inter-ORB Protocol; etc). Configurations for the environments in which the present invention may be practiced include a client/server network, as well as a multi-tier environment. These environments and to configurations are well known in the art.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available.

The application server or proxy server of the present invention may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) The application server or proxy server may also be RS/6000, Netfinity, any PC or Unix machine, or any server hardware capable of hosting a web proxy server or web application server.

Software programming code which embodies the present invention is typically accessed by the microprocessor of the application server or proxy server from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in memory, and accessed by the microprocessor of the application server or proxy server using the bus in the server. The techniques and methods for embodying software programming code in memory, on physical media, and/or distributing software code via networks are well known and will not be further discussed herein.

The present invention may be implemented as one or more modules (also referred to as code subroutines, or "objects" in object-oriented programming) of one or more computer software programs. Preferably, this software operates on a server (such as an application server) or intermediary device (such as an edge or proxy server) in a network. Or, the software may execute on multiple devices in a distributed manner. For example, multiple application servers may share cached data in a centralized database, and each such application server may implement the selective page replacement techniques of the present invention. The present invention may also be used with cached (or cachable) content that is structured along any boundary, such as a fragment of a document or page.

Thus, the present invention provides a novel technique for selectively replacing cached contents and is applicable to distributed computing environments such as client-server environments or other network environments. The selective page replacement techniques of the present invention provide enhanced return services to clients wherein the client's cached (or cachable) content is given prioritized treatment based on resources (e.g., generation costs) needed to recreate the requested content. In this manner, the requested content (e.g., web pages) can be returned to the client more quickly with the minimum use of system resources. Web page providers (e.g., e-merchants, ISPs, etc.) may offer the enhanced return service to their clients for free, for a fixed fee, or for a fee varying according to a graduated pricing policy. Statistics may be accumulated to justify the fee, e.g., by accumulating a count of the number of times Step 435 in FIG. 4 is executed for each user, which caused the user's requested content to take priority over other already-cached contents. Or, conversely, a count may be accumulated of the number of times the user's cached content was "protected" from being overwritten in the cache by newly created content when the test in Step 425 in FIG. 4 outputs a negative result.

With the advent of the J2EE programming model and the amount of enterprise data being provided to web applications from back-end servers, it is desirable to understand the impact of the page replacement policy on the computing resources that supply the pages. By providing a page replacement policy that relies on such computing resources, the present invention provides the ability to better manage the costs associated with providing and maintaining sites on the network. It allows providers of web hosting sites and pages to maintain the lowest possible end-to-end costs for their sites and pages.

Although the present invention has been described with respect to a specific preferred embodiment thereof, various changes and modifications may be suggested to one skilled in the art and it is intended that the present invention encompass such changes and modifications as they fall within the scope of the appended claims.

I claim:

1. A method for managing a cache associated with a computer device in a computing environment, the method comprising the steps of:
   associating each of a plurality of cached contents in the cache with generation information corresponding to a level of resources used to create that cached content, said generation information including a generation cost of each cached content; and
   managing the cache based on the generation cost of each cached content.

2. The method of claim 1, wherein, in the associating step, the generation information for each content is associated with that content using at least one tag.

3. The method of claim 1, wherein the generation information for each content further identifies at least one of the following: an access time associated with that content, an access frequency associated with that content, and a generation time duration associated with the generation of that content.

4. The method of claim 1, wherein the managing step includes:
   storing a new content in the cache if the cache is not full; and
   if the cache is full, comparing generation information associated with the new content with the generation information associated with each of the plurality of cached contents; and
   replacing one of the plurality of cached contents with the new content based on the results of said comparing step.

5. The method of claim 4, wherein, if the results of said comparing step identify multiple cached contents which may be replaced, the replacing step includes:
   selecting one of the multiple cached contents based on a predetermined selection scheme; and
   replacing the selected cached content with the new content.

6. The method of claim 5, wherein, if the results of said comparing step identify no cached content to be replaced, the method further comprises:
   maintaining the cached contents in the cache.

7. The method of claim 1, wherein the computer device is an application server in the computing environment.

8. The method of claim 1, wherein the computer device is a proxy server in the computing environment.

9. The method of claim 1, wherein the plurality of cached contents represent dynamic computer pages.

10. A method for processing a content request using a cache of a servicing device in a computing environment, each of a plurality of cached contents in the cache associated with creation cost information corresponding to a level of resources used to create that cached content, the method comprising the steps of:
    receiving by the servicing device the content request;
    searching the cache of the servicing device for the requested content;

creating the requested content if the requested content is not available from the cache based on results of the searching step, the created content including creation cost information corresponding to a level of resources used to create that content;

attempting to cache the created content based on the creation cost information of the created content and the creation cost information of the cached contents; and outputting by the servicing device the requested content.

11. The method of claim 10, wherein the creation cost information for each content is associated with that content using at least one tag.

12. The method of claim 10, wherein the plurality of contents represent computer page information.

13. The method of claim 10, wherein the creation cost information for each content further identifies at least one of the following: an access time associated with that content, an access frequency associated with that content, and a generation time duration associated with the generation of that content.

14. The method of claim 10, further comprising:

receiving by a second servicing device the requested content output from the outputting step;

determining whether to cache said received content in a second cache of the second servicing device based on the creation cost information associated with said received content; and returning to a user said received content according to the content request.

15. The method of claim 14, wherein the first servicing device is an application server in a communications network, and the second servicing device is a proxy server in the communications network.

16. A device for managing a cache associated with the device in a computing environment, wherein the cache includes a plurality of cached contents, each content associated with generation information corresponding to a level of resources used to create that cached content, and wherein the device manages the cache based on the generation information of each content, said generation information including a generation cost of each content.

17. The device of claim 16, wherein the generation information for each content is associated with that content using at least one tag.

18. The device of claim 16, wherein the generation information for each content further identifies at least one of the following: an access time associated with that content, an access frequency associated with that content, and a generation time duration associated with the generation of that content.

19. The device of claim 16, wherein the device stores a new content in the cache if the cache is not full, and if the cache is full, the device evaluates the generation cost for each of the plurality of cached contents, detects if any cached content is associated with the generation cost which is lower than a generation cost associated with the new content, and replaces the detected cached content with the new content based on the detection results.

20. The device of claim 19, wherein, if the detection results indicate that multiple cached contents are found, the device selects one of the multiple cached contents based on a predetermined selection scheme, and replaces the selected cached content with the new content; and wherein, if the detection results indicate that no cached content is detected, the device maintains the plurality of cached contents in the cache.

21. The device of claim 16, wherein the plurality of cached contents represent computer page information.

22. The device of claim 16, wherein the device is either an application server or a proxy server on a comminations network.

23. A system for processing a content request in a computing environment, the system comprising:

a first cache for storing a plurality of first contents, each of the first contents associated with resource information corresponding to a level of resources used to create that first content; and a first server, associated with the first cache, for receiving the content request, searching the first cache for the requested content, and creating the requested content if the requested content is not available from the first cache, the created content including resource information corresponding to a level of resources used to create that content, said resource information including a creation cost for each content, wherein the first server attempts to cache the created content based on the resource information of the created content and the plurality of first contents.

24. The system of claim 23, wherein the resource information for each content further identifies at least one of the following: an access time associated with that content, an access frequency associated with that content, and a generation time duration associated with the generation of that content.

25. The system of claim 23, wherein the resource information for each content is associated with that content using at least one tag.

26. The system of claim 23, wherein the plurality of first contents represent computer page information.

27. The system of claim 23, further comprising:

a second cache for storing a plurality of second contents, each of the second contents associated with resource information corresponding to a level of resources used to create that content; and a second server, associated with the second cache, for receiving the created content output from the first server, determining whether to cache said received content in the second cache based on the resource information associated with said received content and the second contents, and transmitting said received content to a user.

28. The system of claim 27, wherein the first server is an application server on a communications network, and the second server is a proxy server on the communications network.

29. The system of claim 28, wherein the resource information for each content identifies a cost of creating that content.

30. The system of claim 29, wherein the resource information for each content further identifies at least one of the following: an access time associated with that content, an access frequency associated with that content, and a generation time duration associated with the generation of that content.

31. A computer readable program product embodied on computer readable media, for implementing a method of managing a cache associated with a computer device in a computing environment, the product comprising:

first computer-readable program code means for associating each of a plurality of cached contents in the cache with generation cost information corresponding to a level of resources used to create that cached content; and second computer-readable program code means for managing the cache based on the generation cost information of each content.

32. The product of claim 31, wherein the first computer-readable program code means associates each content with the generation cost information using at least one tag.

33. The product of claim 31, wherein the generation cost information for each content further identifies at least one of the following: an access time associated with that content, an access frequency associated with that content, and a generation time duration associated with the generation of that content.

34. The product of claim 31, wherein the second computer-readable program code means includes:

third computer-readable program code means for storing a new content in the cache if the cache is not full;

fourth computer-readable program code means for comparing generation cost information associated with the new content with the generation cost information associated with each of the plurality of cached contents, if the cache is full; and fifth computer-readable program code means for replacing one of the plurality of cached contents with the new content based on the results of said comparison.

35. The product of claim 31, wherein the computer device is an application server in the computing environment.

36. The product of claim 31, wherein the computer device is a proxy server in the computing environment.

37. The product of claim 31, wherein the plurality of cached contents represent dynamic computer pages.

* * * * *